United States Patent
Lai et al.

(10) Patent No.: US 8,398,955 B2
(45) Date of Patent: Mar. 19, 2013

(54) METHOD OF PREPARING A MOLECULAR SIEVE COMPOSITION

(75) Inventors: Wenyih Frank Lai, Bridgewater, NJ (US); Robert Ellis Kay, Easton, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 322 days.

(21) Appl. No.: 12/738,055

(22) PCT Filed: Sep. 30, 2008

(86) PCT No.: PCT/US2008/078315
§ 371 (c)(1),
(2), (4) Date: Aug. 11, 2010

(87) PCT Pub. No.: WO2009/055216
PCT Pub. Date: Apr. 30, 2009

(65) Prior Publication Data
US 2010/0298598 A1 Nov. 25, 2010

Related U.S. Application Data

(60) Provisional application No. 60/982,982, filed on Oct. 26, 2007, provisional application No. 60/982,945, filed on Oct. 26, 2007.

(51) Int. Cl.
*C01B 33/36* (2006.01)
*C01B 39/00* (2006.01)
*B01J 29/04* (2006.01)
*B01J 29/06* (2006.01)

(52) U.S. Cl. ........ 423/700; 423/702; 423/706; 423/709; 502/60; 502/64; 502/67

(58) Field of Classification Search ........................ None
See application file for complete search history.

(56) References Cited

U.S. PATENT DOCUMENTS 3,354,078 A  11/1967  Miale et al.
(Continued)

FOREIGN PATENT DOCUMENTS

EP    0 255 890    2/1988
EP    0 293 032    11/1988
(Continued)

OTHER PUBLICATIONS

"Periodic table of the elements," Chemical and Engineering News, vol. 63, Issue (5), p. 27 (1985).
(Continued)

*Primary Examiner* — Melvin C Mayes
*Assistant Examiner* — Bijay Saha
(74) *Attorney, Agent, or Firm* — Darryl M. Tyus

(57) ABSTRACT

This disclosure provides a method of preparing a crystalline molecular sieve comprising: (a) providing a reaction mixture comprising at least one source of ions of tetravalent element Y, at least one source of alkali metal hydroxide, water, optionally at least one seed crystal, and optionally at least one source of ions of trivalent element X, the reaction mixture having the following molar composition:

$Y:X_2$=2 to infinity, preferably from about 2 to about 1000,
$OH^-:Y$=0.001 to 2, preferably from 0.1 to 1,
$M^+:Y$=0.001 to 2, preferably from 0.01 to 2 wherein M is an alkali metal and the amount of water is at least sufficient to permit extrusion of the reaction mixture, wherein the reaction mixture is substantially free of crystalline molecular sieve; (b) extruding the reaction mixture to form a pre-formed extrudate; and (c) crystallizing the pre-formed extrudate in a liquid medium comprising water under liquid phase crystallization conditions to form a crystallized extrudate having the crystalline molecular sieve.

19 Claims, 4 Drawing Sheets

U.S. PATENT DOCUMENTS

| | | | |
|---|---|---|---|
| 4,381,256 A | 4/1983 | Hildebrandt | |
| 4,439,409 A | 3/1984 | Puppe et al. | |
| 4,721,806 A | 1/1988 | Zinnen | |
| 4,721,807 A | 1/1988 | Zinnen | |
| 4,826,667 A | 5/1989 | Zones et al. | |
| 4,954,325 A | 9/1990 | Rubin et al. | |
| 5,236,575 A | 8/1993 | Bennett et al. | |
| 5,250,277 A | 10/1993 | Kresge et al. | |
| 5,362,697 A | 11/1994 | Fung et al. | |
| 5,558,851 A | 9/1996 | Miller | |
| 5,665,325 A | 9/1997 | Verduijn | |
| 5,871,650 A | 2/1999 | Lai et al. | |
| 5,895,769 A | 4/1999 | Lai | |
| 6,039,864 A | 3/2000 | Mohr et al. | |
| 6,074,975 A | 6/2000 | Yao et al. | |
| 6,077,498 A | 6/2000 | Diaz Cabañas et al. | |
| 6,099,820 A | 8/2000 | Miller | |
| 6,756,030 B1 | 6/2004 | Rohde et al. | |
| 6,864,203 B2 | 3/2005 | Hendriksen et al. | |
| 6,936,744 B1 | 8/2005 | Cheng et al. | |
| 6,958,305 B2 | 10/2005 | Verduijn et al. | |
| 6,977,320 B2 | 12/2005 | Verduijn et al. | |
| 2007/0059237 A1 | 3/2007 | Miller | |
| 2007/0191658 A1* | 8/2007 | Lai et al. | 585/467 |
| 2008/0027256 A1 | 1/2008 | Roth et al. | |
| 2008/0027259 A1 | 1/2008 | Roth et al. | |
| 2008/0027260 A1 | 1/2008 | Lai et al. | |
| 2008/0045768 A1 | 2/2008 | Roth et al. | |

FOREIGN PATENT DOCUMENTS

| | | |
|---|---|---|
| WO | WO 97/17290 | 5/1997 |
| WO | WO 2005/118476 | 12/2005 |
| WO | WO 2006/015824 | 2/2006 |
| WO | WO 2006/015825 | 2/2006 |
| WO | WO 2006/015826 | 2/2006 |

OTHER PUBLICATIONS

P. B. Weisz et al., "Superactive crystalline aluminosilicate hydrocarbon catalysts," Journal of Catalysis, vol. 4, Issue 4, pp. 527-529 (1965).

J. N. Miale et al., "Catalysis by crystalline aluminosilicates: IV. Attainable catalytic cracking rate constants, and superactivity," Journal of Catalysis, vol. 6, Issue 2, pp. 278-287 (1966).

D. H. Olson et al., "Chemical and physical properties of the ZSM-5 substitutional series," Journal of Catalysis, vol. 61, Issue 2, pp. 390-396 (1980).

* cited by examiner

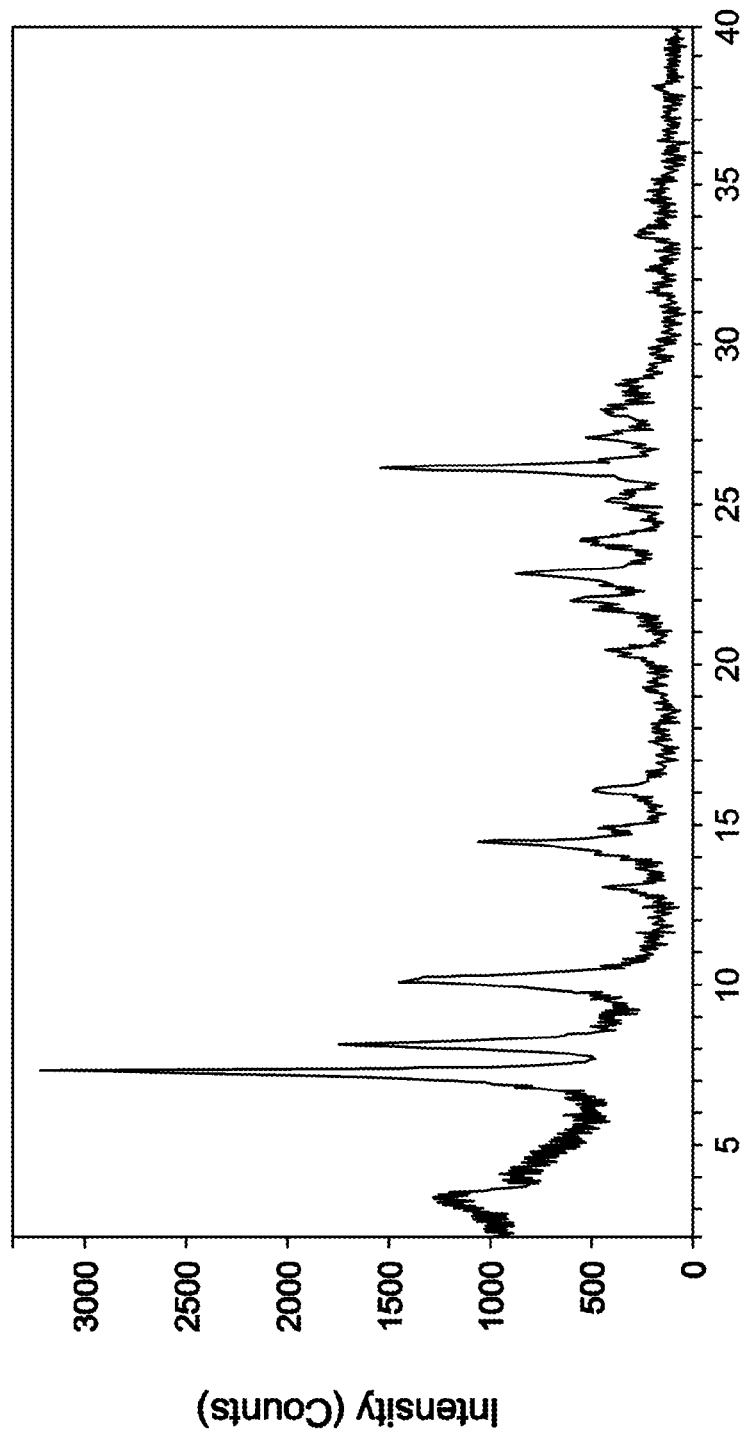

METHOD OF PREPARING A MOLECULAR SIEVE COMPOSITION

CROSS-REFERENCE TO RELATED APPLICATIONS

This application is a national stage filing of International Patent Cooperation Treaty Application No. PCT/US2008/78315 filed Sep. 30, 2008, which claims the benefit of and priority to U.S. Provisional patent application Ser. Nos. 60/982,982, filed Oct. 26, 2007, and 60/982,945, filed Oct. 26, 2007.

FIELD OF THE INVENTION

The present disclosure relates to methods of preparing molecular sieve compositions, particularly but not exclusively, to method for crystallizing pre-formed extrudates in a liquid medium comprising water under liquid phase crystallization conditions.

BACKGROUND OF THE INVENTION

Molecular sieve materials, both natural and synthetic, have catalytic properties for various types of hydrocarbon conversion. Certain molecular sieves (e.g., zeolites, AlPOs, and/or mesoporous materials) are ordered, porous crystalline materials having a definite crystalline structure. Within the crystalline molecular sieve material there are a large number of cavities which may be interconnected by a number of channels or pores. These cavities and pores are uniform in size within a specific molecular sieve material. Since the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline oxides of tetravalent element. These oxides of tetravalent element can be described as a rigid three-dimensional framework of $YO_4$ and a trivalent element oxide, such as a Group 13 element oxide (e.g., $AlO_4$) (as defined in the Periodic Table, Chemical and Engineering News, 63(5), 27 (1985)). The tetrahedra are cross-linked by the sharing of oxygen atoms whereby the ratio of the total trivalent element (e.g., aluminum) and tetravalent atoms to oxygen atoms is 1:2. The electrovalence of the tetrahedra containing the trivalent element (e.g., aluminum) is balanced by the inclusion in the crystal of a cation, for example a proton, an alkali metal or an alkaline earth metal cation. This can be expressed as the ratio of the trivalent element (e.g., aluminum) to the number of various cations, such as $H^+$, $Ca^{2+}/2$, $Sr^{2+}/2$, $Na^+$, $K^+$, or $Li^+$, being equal to unity.

Molecular sieves that find application in catalysis include any of the naturally occurring or synthetic crystalline molecular sieves. Examples of these sieves include large pore zeolites, intermediate pore size zeolites, and small pore zeolites. These zeolites and their isotypes are described in "Atlas of Zeolite Framework Types", eds. W. H. Meier, D. H. Olson and Ch. Baerlocher, Elsevier, Fifth Edition, 2001, which is herein incorporated by reference. A large pore zeolite generally has a pore size of at least about 7 Å and includes LTL, VFI, MAZ, FAU, OFF, *BEA, and MOR framework type zeolites (IUPAC Commission of Zeolite Nomenclature). Examples of large pore zeolites include mazzite, offretite, zeolite L, VPI-5, zeolite Y, zeolite X, omega, and zeolite beta. An intermediate pore size zeolite generally has a pore size from about 5 Å to less than about 7 Å and includes, for example, MFI, MEL, EUO, MTT, MFS, AEL, AFO, HEU, FER, MWW, and TON framework type zeolites (IUPAC Commission of Zeolite Nomenclature). Examples of intermediate pore size zeolites include ZSM-5, ZSM-11, ZSM-22, "MCM-22 family material", silicalite 1, and silicalite 2. A small pore size zeolite has a pore size from about 3 Å to less than about 5.0 Å and includes, for example, CHA, ERI, KFI, LEV, SOD, and LTA framework type zeolites (IUPAC Commission of Zeolite Nomenclature). Examples of small pore zeolites include ZK-4, ZSM-2, SAPO-34, SAPO-35, ZK-14, SAPO-42, ZK-21, ZK-22, ZK-5, ZK-20, zeolite A, chabazite, zeolite T, gmelinite, ALPO-17, and clinoptilolite.

The term "MCM-22 family material" (or "material of the MCM-22 family" or "molecular sieve of the MCM-22 family"), as used herein, includes one or more of:

(i) molecular sieves made from a common first degree crystalline building block unit cell, which unit cell has the MWW framework topology. (A unit cell is a spatial arrangement of atoms which if tiled in three-dimensional space describes the crystal structure. Such crystal structures are discussed in the "Atlas of Zeolite Framework Types", Fifth edition, 2001, the entire content of which is incorporated as reference);

(ii) molecular sieves made from a common second degree building block, being a 2-dimensional tiling of such MWW framework topology unit cells, forming a monolayer of one unit cell thickness, preferably one c-unit cell thickness;

(iii) molecular sieves made from common second degree building blocks, being layers of one or more than one unit cell thickness, wherein the layer of more than one unit cell thickness is made from stacking, packing, or binding at least two monolayers of one unit cell thickness. The stacking of such second degree building blocks can be in a regular fashion, an irregular fashion, a random fashion, or any combination thereof; and (iv) molecular sieves made by any regular or random 2-dimensional or 3-dimensional combination of unit cells having the MWW framework topology.

The MCM-22 family materials are characterized by having an X-ray diffraction pattern including d-spacing maxima at 12.4±0.25, 3.57±0.07 and 3.42±0.07 Angstroms (either calcined or as-synthesized). The MCM-22 family materials may also be characterized by having an X-ray diffraction pattern including d-spacing maxima at 12.4±0.25, 6.9±0.15, 3.57±0.07 and 3.42±0.07 Angstroms (either calcined or as-synthesized). The X-ray diffraction data used to characterize the molecular sieve are obtained by standard techniques using the K-alpha doublet of copper as the incident radiation and a diffractometer equipped with a scintillation counter and associated computer as the collection system. Materials belong to the MCM-22 family include MCM-22 (described in U.S. Pat. No. 4,954,325 and U.S. patent application Ser. No. 11/823,722 now U.S. Pat. No. 7,883,686), PSH-3 (described in U.S. Pat. No. 4,439,409), SSZ-25 (described in U.S. Pat. No. 4,826,667), ERB-1 (described in European Patent No. 0293032), ITQ-1 (described in U.S. Pat. No. 6,077,498), ITQ-2 (described in International Patent Publication No. WO97/17290), ITQ-30 (described in International Patent Publication No. WO2005118476), MCM-36 (described in U.S. Pat. No. 5,250,277), MCM-49 (described in U.S. Pat. No. 5,236,575), UZM-8 described in U.S. Pat. No. 6,756,030), MCM-56 (described in U.S. Pat. No. 5,362,697), EMM-10-P (described in U.S. patent application Ser. No. 11/823,129 now U.S. Pat. No. 7,959,899), and EMM-10 (described in U.S. patent application Ser. No. 11/824,742 now U.S. Pat. No. 8,110,176 and Ser. No. 11/827,953 now U.S. Pat. No. 7,842,277). The entire contents of the patents are incorporated herein by reference.

It is to be appreciated the MCM-22 family molecular sieves described above are distinguished from conventional large pore zeolite alkylation catalysts, such as mordenite, in that the MCM-22 materials have 12-ring surface pockets which do not communicate with the 10-ring internal pore system of the molecular sieve.

The zeolitic materials designated by the IZA-SC as being of the MWW topology are multi-layered materials which have two pore systems arising from the presence of both 10 and 12 membered rings. The Atlas of Zeolite Framework Types classes five differently named materials as having this same topology: MCM-22, ERB-1, ITQ-1, PSH-3, and SSZ-25.

The MCM-22 family molecular sieves have been found to be useful in a variety of hydrocarbon conversion processes. Examples of MCM-22 family molecular sieve are MCM-22, MCM-49, MCM-56, ITQ-1, PSH-3, SSZ-25, and ERB-1. Such molecular sieves are useful for alkylation of aromatic compounds. For example, U.S. Pat. No. 6,936,744 discloses a process for producing a monoalkylated aromatic compound, particularly cumene, comprising the step of contacting a polyalkylated aromatic compound with an alkylatable aromatic compound under at least partial liquid phase conditions and in the presence of a transalkylation catalyst to produce the monoalkylated aromatic compound, wherein the transalkylation catalyst comprises a mixture of at least two different crystalline molecular sieves, wherein each of said molecular sieves is selected from zeolite beta, zeolite Y, mordenite and a material having an X-ray diffraction pattern including d-spacing maxima at 12.4±0.25, 6.9±0.15, 3.57±0.07 and 3.42±0.07 Angstrom (Å).

The MCM-22 family molecular sieves including MCM-22, MCM-49, and MCM-56 have various applications in hydrocarbon conversion processes. Unfortunately, industrial applications of zeolite catalysts have been hindered due to some major disadvantages associated with the current synthesis techniques that make large scale production of these catalysts complicated and therefore expensive. At present, crystalline zeolite catalysts are synthesized mainly by conventional liquid-phase hydrothermal treatment, including in-situ crystallization and seeding method, and the vapor phase transport method.

In the hydrothermal method, a reaction mixture of silica, alumina, caustic agent, an organic template or structure directing agent, and water is heated at a high temperature in a liquid phase to produce crystalline zeolite crystals (e.g., described in U.S. Pat. No. 5,871,650). The product is recovered by filtration and washing followed by calcination.

U.S. Pat. No. 5,558,851 discloses a method for preparing a crystalline aluminosilicate zeolite from a reaction mixture containing only sufficient water so that the reaction mixture may be shaped if desired. In the method, the reaction mixture is heated at crystallization conditions and in the absence of an external liquid phase, so that excess liquid need not be removed from the crystallized material prior to drying the crystals.

U.S. Pat. No. 6,099,820 discloses a method for preparing a crystalline zeolite having the X-ray diffraction lines of Table 1 of the U.S. Pat. No. 6,099,820. The method includes preparing a template-free reaction mixture including at least one active source of a first oxide selected from the group consisting of an oxide of silicon, germanium or both, optionally at least one active source of a second oxide selected from the group consisting of an oxide of aluminum, boron, gallium, iron or a mixture thereof; and heating the reaction mixture at crystallization conditions for sufficient time to form a crystallized material containing zeolite crystals having the X-ray diffraction lines of Table 1 of the U.S. Pat. No. 6,099,820, where said zeolite crystals have a first oxide/second oxide molar ratio greater than 12.

U.S. Pat. Nos. 5,665,325, 6,864,203, 6,039,864, 6,958,305, and 6,977,320 disclose a binder-free zeolite (or zeolite-bound-zeolite) process for producing substantially binder-free zeolites, and the use of these zeolites in catalysis and in separation processes.

U.S. Pat. No. 5,871,650 discloses a new zeolite membrane which exhibits a columnar cross-sectional morphology and preferred crystallographic orientation comprising a porous substrate having coated thereon a mesoporous growth enhancing layer and a layer of columnar zeolite crystals on said mesoporous growth enhancing layer, and wherein said mesoporous growth enhancing layer comprises nanocrystalline or colloidal sized zeolites, nanocrystalline or colloidal zeolite and metal oxide, or nanocrystalline or colloidal zeolite and colloidal metal, or nanocrystalline or colloidal zeolite, colloidal metal and metal oxide, and wherein said mesoporous growth enhancing layer has interstices of about 20 to about 2000 Å, and wherein said columnar zeolite layer is a polycrystalline layer wherein 99.9% of said columnar zeolite crystals have at least one point between adjacent crystals that is <20 Å. This disclosure is further directed to a process of producing a zeolite membrane exhibiting a columnar crystallographic orientation.

U.S. Pat. No. 5,895,769 discloses a new zeolite containing composition and a process for preparing the same. The composition is unique in that the zeolite crystals making up one layer of the composition pack in a manner such that the composition is essentially continuous with no large scale voids even when the zeolite layer is <10 μm thick. This disclosure is directed toward a composition comprised of a porous substrate and a layer of zeolite crystals wherein said layer of zeolite crystals is a polycrystalline layer with at least 99% of said zeolite crystals having at least one point between adjacent crystals that is ≦20 Å and wherein at least 90% of said crystals have widths of from about 0.2 to about 100 microns (preferably about 2 to about 50 microns) and wherein at least 75% of said crystals have a thickness of within 20% of the average crystal thickness. Preferably the composition has at most 1 volume % voids in the zeolite layer. Use of the composition is also described.

U.S. Pub. 2007-0191658 A1 discloses an improved vapor phase crystallization process by:
(a) providing a reaction mixture comprising at least one source of ions of tetravalent element Y, at least one source of alkali metal hydroxide, water, optionally at least one seed crystal, and optionally at least one source of ions of trivalent element X, said reaction mixture having the following mole composition:
    $Y:X_2$=10 to infinity
    $OH^-:Y$=0.001 to 2
    $M^-:Y$=0.001 to 2
    wherein Y is a tetravalent element, X is a trivalent element, M is an alkali metal and the amount of water is at least sufficient to permit extrusion of said reaction mixture;
(b) extruding said reaction mixture to form a pre-formed extrudate; and
(c) crystallizing said pre-formed extrudate under vapor phase conditions in a reactor to form said crystalline molecular sieve whereby excess alkali metal hydroxide is removed from the pre-formed extrudate during crystallization.

There is a need for high throughput molecular sieve compositions made by crystallization of pre-formed extrudates in a liquid medium comprising water under liquid phase crystallization conditions, said molecular sieve compositions having at least one crystalline molecular sieve and optionally a non-molecular sieve portion. Methods are needed to enable large quantities of molecular sieve compositions to be produced with higher utilization of organic template and silica, while advantageously generating less wastewater as compared to known vapor phase methods. Also, improved methods are needed which minimize post-synthesis purification steps and simplify reactor design. This disclosure meets these and other needs.

SUMMARY OF THE INVENTION

This disclosure relates to methods of preparing molecular sieve composition having at least one crystalline molecular sieve comprising the steps of:
(a) providing a reaction mixture comprising at least one source of ions of tetravalent element Y, at least one source of alkali metal hydroxide, water, optionally at least one seed crystal and/or at least one source of ions of trivalent element X, the reaction mixture having the following molar composition:
Y:$X_2$=2 to infinity, preferably from about 2 to about 1000 or 10 to about 1000, more preferably from about 10 to 500 or 15 to 500;
$OH^-$:Y=0.1 to 1 or 0.001 to 2, preferably from 0.5 to 1;
$M^+$:Y=0.001 to 2, preferably from 0.5 to 1,
wherein M is an alkali metal and the amount of water is at least sufficient to permit extrusion of the reaction mixture, wherein one or more embodiments of the reaction mixture is substantially free of a crystalline molecular sieve;
(b) extruding the reaction mixture to form a pre-formed extrudate; and
(c) crystallizing the pre-formed extrudate in a liquid medium comprising water under liquid phase crystallization conditions to form said molecular sieve composition having said crystalline molecular sieve.

In one or more embodiments of the methods of this disclosure, said reaction mixture of extruding step (b) further comprises a first crystalline molecular sieve, and said crystallizing step (c) further comprises a second crystalline molecular sieve in addition to said molecular sieve composition having said first crystalline molecular sieve, wherein said second crystalline molecular sieve is different from said first crystalline molecular sieve.

In one or more embodiments, the methods of this disclosure are characterized by the first crystalline molecular sieve comprising at least one of zeolite beta, zeolite Y, mordenite, ZSM-5, ZSM-23, ZSM-11, ZSM-22, ZSM-35 and ZSM-12.

In one or more embodiments, the liquid phase crystallization conditions are sufficient to substantially convert the pre-formed extrudate to crystalline molecular sieve. In some embodiments, these methods are characterized by the molecular sieve composition which comprises less about 20 wt. %, preferably less than 10 wt. %, more preferably less than 5 wt. %, of non-crystalline material.

In other embodiments, the molecular sieve composition products of the methods of this disclosure have crush strength measured by the above-described Mobil Test of less than 9.8 kg/cm, more preferably less than 7.2 kg/cm and most preferably less than 5.4 kg/cm.

In preferred embodiments, the reaction mixture has a $H_2O$:Y ratio in the range of 0.1 to 30 or 0.1 to 10 and preferably 2 to 10.

In some embodiments, the pre-formed extrudate comprises at least one structure directing agent R. In other embodiments, the liquid medium comprises at least one structure directing agent R.

In one aspect, the pre-formed extrudate is submerged in the liquid medium. In another aspect, the liquid medium is agitated.

In some embodiments, the mixture and/or pre-formed extrudate are exposed to an autogenous pressure in the range of 345 kPa-a to 3450 kPa-a and a temperature of 50° C. to 250° C. during crystallizing step.

In one or more embodiments, the method comprises the additional steps of washing and drying the crystalline molecular sieve product. In another embodiment, the mixture is dried prior to step (c).

In preferred embodiments, the mixture and/or pre-formed extrudate are suited to form crystals of molecular sieves of the MCM-22 family, preferably the MCM-22 family molecular sieves comprising at least one of MCM-22, MCM-49, and MCM-56, under the liquid phase crystallization conditions.

This disclosure also relates to molecular sieve compositions having at least one crystalline molecular sieve prepared by any method of this disclosure.

This disclosure also relates to a catalyst composition prepared by:
(a) providing an extrusion mixture which comprises a molecular sieve composition having at least one crystalline molecular sieve prepared by any method of this disclosure, optionally one or more binders, and optionally one or more extrusion aids; and
(b) extruding the extrusion mixture to form the catalyst composition.

This disclosure also relates to a process for converting hydrocarbons comprising the step of contacting a hydrocarbon feedstock under conversion conditions with a catalyst comprising the molecular sieve composition having at least one crystalline molecular sieve prepared by any method of this disclosure.

BRIEF DESCRIPTION OF THE DRAWINGS

FIGS. 3A and 3B show XRD patterns of samples made in Example 5.

DETAILED DESCRIPTION OF THE INVENTION

Figures 1A, 1B, 1C, 1D:
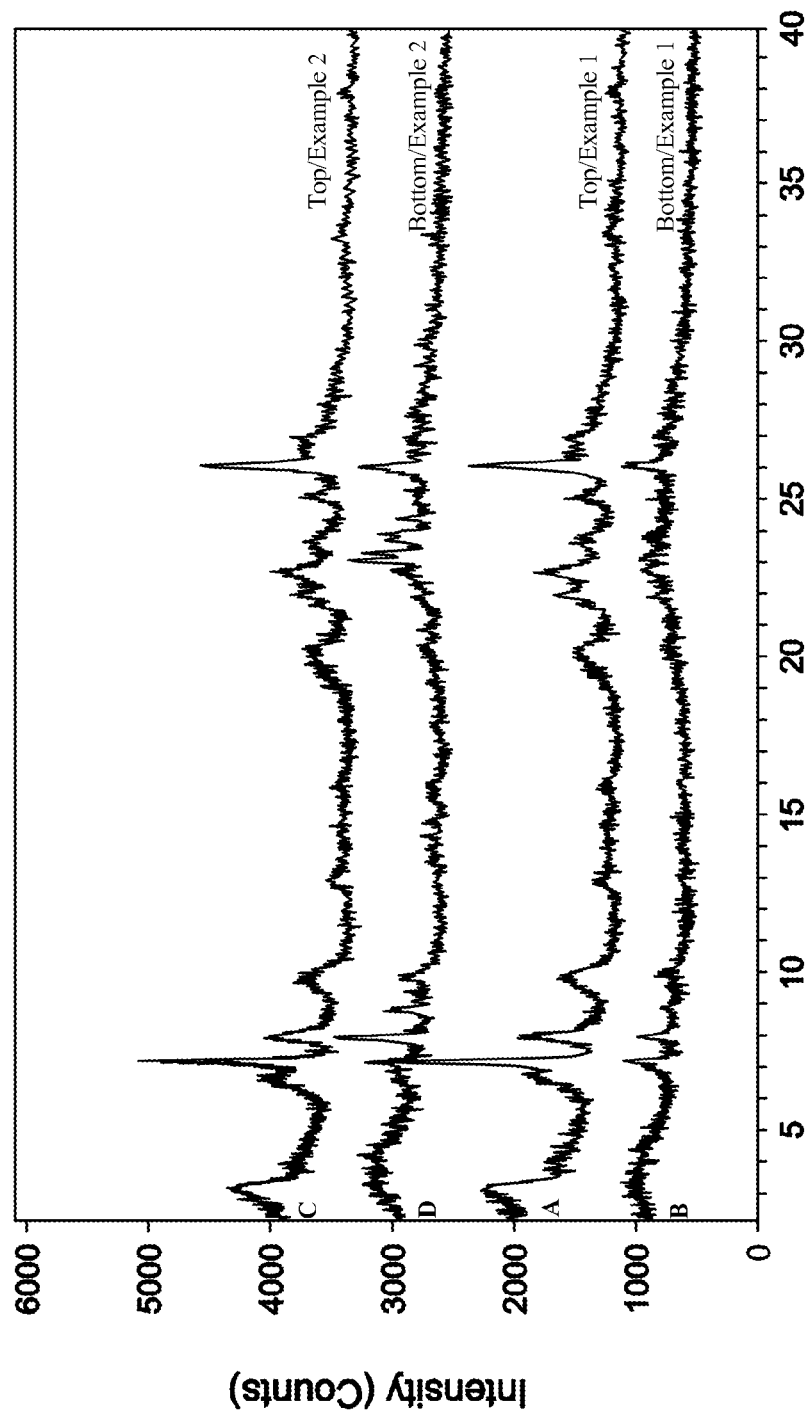
FIGS. 1A, 1B, 1C, and 1D show XRD patterns of samples made in Examples 1 and 2.

The present disclosure relates to methods of preparing molecular sieve compositions, particularly, but not exclusively, to methods for crystallizing pre-formed extrudates in a liquid medium comprising water under liquid phase crystallization conditions, in which the pre-formed extrudates may include a first molecular sieve portion and optionally a non-molecular sieve portion. This method provides a more efficient and simpler liquid phase crystallization process which produces a large quantity of crystalline such molecular sieve compositions with high utilization of organic template and silica, advantageously generate less wastewater (e.g., mother liquor) as compared to prior art processes, thereby minimizing effort in purification steps, simplifying reactor design, and affording the high production throughput. The pre-formed extrudate (including the non-molecular sieve portion when present) is substantially converted to crystalline molecular sieve.

According to embodiments of this disclosure, there is provided methods of preparing molecular sieve compositions having at least one crystalline molecular sieve and methods for preparing the same as defined by the accompanying claims.

As used in this specification, the term "framework type" is used in the sense described in the "Atlas of Zeolite Framework Types," 2001.

As used herein, the numbering scheme for the Periodic Table Groups is used as in Chemical and Engineering News, 63(5), 27 (1985).

The term "wppm" as used herein is defined as parts per million by weight.

The term "substantially free" as used herein means less than 5 wt. % and preferably less than 1 wt. %. For example, the reaction mixture is substantially free of crystalline molecular sieve means the reaction mixture has less than 5 wt. % and preferably less than 1 wt. % crystalline molecular sieve (not including seed crystals).

The term "substantially converted" as used herein means at least 80 wt. %, preferably at least 85 wt. %, and more preferably at least 90 wt. % converted. For example, the pre-formed extrudate is substantially converted to crystalline molecular sieve means that at least 80 wt. %, preferably at least 85 wt. %, and more preferably at least 90 wt. % of the non-crystalline material in the pre-formed extrudate is substantially converted to crystalline molecular sieve. The crystallized extrudate normally comprises less about 20 wt. %, preferably less than 10 wt. %, and more preferably less than 5 wt. %, of non-crystalline material based on the total weight of the pre-formed extrudate.

When numerical lower limits and numerical upper limits are listed herein, ranges from any lower limit to any upper limit are contemplated.

Disclosed are methods of preparing molecular sieve composition having at least one crystalline molecular sieve comprising the steps of:
(a) providing a reaction mixture comprising at least one source of ions of tetravalent element Y, at least one source of alkali metal hydroxide, water, optionally at least one seed crystal and/or at least one source of ions of trivalent element X, the reaction mixture having the following molar composition:
Y:$X_2$=2 to infinity, preferably from about 2 to about 1000 or 10 to about 1000, more preferably from about 10 to 500 or 15 to 500;
$OH^-$:Y=0.1 to 1 or 0.001 to 2, preferably from 0.5 to 1;
$M^+$:Y=0.001 to 2, preferably from 0.5 to 1,
wherein M is an alkali metal and the amount of water is at least sufficient to permit extrusion of the reaction mixture, wherein in one or more embodiments said reaction mixture is substantially free of crystalline molecular sieve;
(b) extruding the reaction mixture to form a pre-formed extrudate; and
(c) crystallizing the pre-formed extrudate in a liquid medium comprising water under liquid phase crystallization conditions to form said molecular sieve composition having said crystalline molecular sieve.

The sources of the various elements required in the final product may be any of those in commercial use or described in the literature, as may the method of preparation of the synthesis mixture.

Y is a tetravalent element selected from Groups 4-14 of the Periodic Table of the Elements, such as silicon and/or germanium, preferably silicon. In some embodiments of this disclosure, the source of $YO_2$ comprises solid $YO_2$, preferably about 30 wt. % solid $YO_2$ in order to obtain the crystal product of this disclosure. When $YO_2$ is silica, the use of a silica source containing preferably about 30 wt. % solid silica, e.g., silica sold by Degussa under the trade names Aerosil or Ultrasil (a precipitated, spray dried silica containing about 90 wt. % silica), an aqueous colloidal suspension of silica, for example one sold by Grace Davison under the trade name Ludox, or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystal formation from the above mixture. Preferably, therefore, the $YO_2$, e.g., silica, source contains about 30 wt. % solid $YO_2$, e.g., silica, and more preferably about 40 wt. % solid $YO_2$, e.g., silica. The source of silicon may also be a silicate, e.g., an alkali metal silicate, or a tetraalkyl orthosilicate.

In additional embodiments of this disclosure, the source of $YO_2$ comprises acid of the tetravalent element (Y). When $YO_2$ is silica, the silica source may be silicic acid.

X is a trivalent element selected from Groups 3-13 of the Periodic Table of the Elements, such as aluminum, and/or boron, and/or iron and/or gallium, preferably aluminum. The source of $X_2O_3$, e.g., aluminum, is preferably aluminum sulphate, aluminum nitrate or hydrated alumina. Other aluminum sources include, for example, other water-soluble aluminum salts, sodium aluminate, or an alkoxide, e.g., aluminum isopropoxide, or aluminum metal, e.g., in the form of chips.

The alkali or alkali earth metal element is advantageously lithium, sodium, potassium, calcium, or magnesium. The source of alkali or alkali earth metal element is advantageously being metal oxide, metal chloride, metal fluoride, metal sulfate, metal nitrate, or metal aluminate. The sodium source advantageously is sodium hydroxide or sodium aluminate. The alkali metal may also be replaced by ammonium ($NH_4^+$) or its equivalents, e.g., alkyl-ammonium ion.

In a preferred embodiment of the method of this disclosure, the crystallization is carried out in the presence of a structure directing agent R. Thus in one embodiment, the reaction mixture additionally comprises R, such that the pre-formed extrudate comprises a structure directing agent R. In another embodiment, the structure directing agent R is made available to the crystallization reaction by being contained in the liquid medium but not in the pre-formed extrudate. In yet another embodiment the structure directing agent may form part of the reaction mixture used to form the pre-formed extrudate, and a further amount of structure directing agent R, may be provided in the liquid medium separate from the pre-formed extrudate.

In a preferred embodiment, directing agent R preferably comprises at least one of cycloalkylamine, azacycloalkane, diazacycloalkane, N,N,N,N'N'N'-hexamethyl-1,5-hexanediaminium ($Me_6$-diquat-6) salt or N,N,N,N'N'N'-hexamethyl-1,5-pentanediaminium ($Me_6$-diquat-5) salt, and mixtures thereof, with alkyl preferably comprising from 5 to 8 carbon atoms. Non-limiting examples of R include cyclopentylamine, cyclohexylamine, cycloheptylamine, hexamethyleneimine (HMI), heptamethyleneimine, homopiperazine, and combinations thereof. Examples of $Me_6$-diquat-5 salt are hydroxide, chloride, bromide, fluoride, nitrate, sulfate, phosphate, or any mixture thereof. Examples of $Me_6$-diquat-6 salt are hydroxide, chloride, bromide, fluoride, nitrate, sulfate, phosphate, or any mixture thereof.

In some embodiments, the directing agent R comprises at least one of HMI, $Me_6$-diquat-5 dibromide, $Me_6$-diquat-5 dichloride, $Me_6$-diquat-5 difluoride, $Me_6$-diquat-5 diiodide, $Me_6$-diquat-5 dihydroxide, $Me_6$-diquat-5 sulfate, $Me_6$-diquat-5 dinitrate, $Me_6$-diquat-5 hydroxide bromide, $Me_6$-diquat-5 hydroxide chloride, $Me_6$-diquat-5 hydroxide fluoride, $Me_6$-diquat-5 hydroxide iodide, $Me_6$-diquat-5 hydroxide nitrate, $Me_6$-diquat-5 fluoride bromide, $Me_6$-diquat-5 fluoride chloride, $Me_6$-diquat-5 fluoride iodide, $Me_6$-diquat-5 fluoride nitrate, $Me_6$-diquat-5 chloride bromide, $Me_6$-diquat-5 chloride iodide, $Me_6$-diquat-5 chloride nitrate, $Me_6$-diquat-5 iodide bromide, $Me_6$-diquat-5 bromide nitrate, $Me_6$-diquat-6 dibromide, $Me_6$-diquat-6 dichloride, $Me_6$-diquat-6 difluoride, $Me_6$-diquat-6 diiodide, $Me_6$-diquat-6 dihydroxide, $Me_6$-diquat-6 sulfate, $Me_6$-diquat-6 dinitrate, $Me_6$-diquat-6 hydroxide bromide, $Me_6$-diquat-6 hydroxide chloride, $Me_6$-diquat-6 hydroxide fluoride, $Me_6$-diquat-6 hydroxide iodide, $Me_6$-diquat-6 hydroxide nitrate, $Me_6$-diquat-6 fluoride bromide, $Me_6$-diquat-6 fluoride chloride, $Me_6$-diquat-6 fluoride iodide, $Me_6$-diquat-6 fluoride nitrate, $Me_6$-diquat-6 chloride bromide, $Me_6$-diquat-6 chloride iodide, $Me_6$-diquat-6 chloride nitrate, $Me_6$-diquat-6 iodide bromide, $Me_6$-diquat-6 bromide nitrate, and any mixtures thereof.

The amount of the directing agent affects the cost and the product quality of the synthesis of a crystalline molecular sieve. The directing agent is generally the most expensive reactant(s) in the hydrothermal reaction mixture of many crystalline molecular sieves. The lower the amount of the directing agent in the hydrothermal reaction mixture, the cheaper the final molecular sieve produced. In one embodiment of this disclosure R:$YO_2$ molar ratio ranges from 0 to 2, preferably from 0.001 to 1, more preferably from 0.001 to 0.5, even more preferably from 0.001 to 0.3, and most preferably from 0.1 to 0.2. The R:$YO_2$ molar ratio is measured using the total R present in the reaction mixture and the liquid medium.

The composition of the reaction mixture and reaction parameters affects the quality and homogeneousness of the product. In preferred embodiments, the composition of the reaction mixture comprises Y:$X_2$ ratio in the range of 2 to infinity, preferably 2 to 1000 or 10 to about 1000, and more preferably 10 to 500 or 15 to 500, the $OH^-$:Y ratio in the range of 0.001 to 2 and preferably 0.1 to 1 or 0.5 to 1, and the $M^+$:Y ratio in the range of 0.001 to 2 and preferably 0.1 to 1 or 0.5 to 1.

The amount of water is at least sufficient to permit extrusion to form the pre-formed extrudates. In some embodiments, the $H_2O$:Y ratio is in the range of 0.1 to 50, preferably 0.1 to 30, 1 to 30, more preferable in the range of 2 to 10, alternatively in the range of 4 to 8.

Preferably the reaction mixture includes 0 to about 25 wt. % based on total weight of tetrahedral element oxide (e.g., silica) of the reaction mixture, preferably about 1 to about 5 wt. %, seed crystals of the molecular sieve, to facilitate the crystallization reaction. The following seed crystals, in wt. % based on total weight of tetrahedral element oxide of the reaction mixture, are useful lower seed crystals wt. % limits for all disclosure processes: 0.001, 0.002, 0.005, 0.01, 0.02, 0.05, 0.1, 0.2, 0.5, 1, 2, 5, 10 and 15. The following seed crystals, in wt. % based on total weight of tetrahedral element oxide of the reaction mixture, are useful upper seed crystals wt. % limits for all disclosure processes: 1, 2, 5, 10, 15, 20 and 25. The seed crystals wt. % ideally falls in a range between any one of the above-mentioned lower limits and any one of the above-mentioned upper limits, so long as the lower limit is less than or equal to the upper limit. The seed crystals, in wt. % based on total weight of tetrahedral element oxide of the reaction mixture, may be present in an amount ranging from 0.001 to 25 in one embodiment, alternatively 0.01 to 20, alternatively from 0.1 to 10, alternatively 0.5 to 10, alternatively 0.5 to 5, alternatively and from 0.1 to 5 in another embodiment.

The pre-formed extrudate may also comprise a first molecular sieve. The amount of the first molecular sieve in the pre-formed extrudate is in the range of 1 to 99 wt. %, preferably 10 to 50 wt. %, more preferably in the range of 20 to 50 wt. %.

In one embodiment of this disclosure, the pre-formed extrudate mixture may be exposed to an autogenous pressure and temperature which allow crystallization of the mixture under vapor phase conditions. Suitable pressures may be in the range, for example, of from 448 kPa-a to 7.0 MPa-a, preferably from 656 kPa-a to 3.6 MPa-a, and more preferably 790 kPa-a to 2.17 MPa-a. Suitable temperatures may vary from 50° C. to 500° C., preferably from 80° C. to 250° C., more preferably from 100° C. to 250° C. The reactor may comprise an autoclave or any other suitable chamber in which controlled pressure and elevated temperature conditions for promoting crystallization can be provided.

Preferably, the crystallization process is carried out with any type of agitation, e.g., stirring the liquid medium, rotating the pre-formed extrudates, or rotating the vessel about a horizontal axis (tumbling). In some embodiments, the crystallization conditions have the following agitation rates that are useful agitation rate limits for all disclosure processes: 1, 10, 20, 50, 100, 200 and 500 and the following agitation rates that are useful upper agitation rate limits for all disclosure processes: 100, 200, 500 and 1000. The agitation rate of the crystallization conditions ideally falls in a range between any one of the above-mentioned lower limits and any one of the above-mentioned upper limits, so long as the lower limit is less than or equal to the upper limit. The agitation rate of the crystallization conditions may be present in an amount ranging from 1 to 500 in one embodiment, alternatively 10 to 200, alternatively from 50 to 500, alternatively 20 to 500, alternatively 50 to 1000, alternatively and from 10 to 500 in another embodiment.

Not wishing to be bounded by any theory, we believe that the stirring or circulation of the liquid medium promote the uniform distribution of organic template in the liquid medium which results in a more uniform final product and less impurities.

In another preferred embodiments of this disclosure, the pre-extruded mixture is provided within the reactor on a support, the support being adapted to allow to flowing of liquid medium during crystallization. The support spaces the extrudate from the reactor wall. The support may also promote heat circulation during crystallization of the synthesized mixture.

In preferred embodiments, the pre-extruded synthesis mixture is spaced from at least one inner perimeter of the reactor by any suitable means such as the support. The mixture may be spaced from one or more walls. The mixture may also be spaced from a floor of the reactor. Separation of the mixture from the reactor walls promotes removal of the caustic agent and enhances heat circulation and promotes exposure of the mixture to the liquid phase.

The support may be formed by a sieve or grid or mesh. In this way the support does not affect the heat circulation whilst allowing efficient removal of the alkali metal hydroxide caustic agent during crystallization.

In preferred embodiments, the tetravalent element is silicon and the source of ions thereof preferably comprises a source of silica. The trivalent element is preferably aluminum and the source of ions thereof preferably comprises a source of alumina.

The first molecular sieve of the reaction mixture comprises at least one of a MCM-22 family molecular sieve, ETS-10, ETAS-10, ETGS-10, and a molecular sieve having a zeolite framework type comprising at least one of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, *BEA, BEC, BIK, BOG, BPH, BRE, CAN, CAS, CDO, CFI, CGF, CGS, CHA, -CHI, -CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, IMF, ISV, ITE, ITH, ITW, IWR, IWV, IWW, JBW, KFI, LAU, LEV, LIO, -LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, -PAR, PAU, PHI, PON, RHO, -RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TOL, TON, TSC, TUN, UEI, UFI, UOZ, USI, UTL, VET, VFI, VNI, VSV, WEI, -WEN, YUG, and ZON.

In preferred embodiments, the compositions of the reaction mixture for making molecular sieve compositions having at least one of MCM-22, MCM-49, EMM-10, and MCM-56 may comprise (molar ratios):

$SiO_2/Al_2O_3$: 10-500;
$OH^-/SiO_2$: 0.001-0.5;
$Na/SiO_2$: 0.001-0.5;
$R/SiO_2$: 0.05-0.5; and
$H_2O/SiO_2$: 1-20.

In the case where seed crystals are present, the seed concentration of the respective MCM-22, MCM-49 or MCM-56 seed crystals is preferably 0.1 to 40 wt. % of the extrudate.

In further embodiments, there is provided a method for preparing a catalyst comprising preparing a molecular sieve according to the method as hereinbefore described and activating the sieve to form the catalyst. The sieve may be activated for example by water post-treatment of the crystal and/or by surface modification. Suitable surface modification may comprise surface treatment to provide a metal oxide on the catalyst surface such as aluminum oxide.

In yet another embodiments, there is provided a catalyst which is formed from molecular sieve compositions having at least one crystalline molecular sieve produced by the process of this disclosure.

By virtue of the manufacturing method as herein described, the molecular sieves produced and the corresponding catalyst may for example comprise a surface area of at least 300 m²/g preferably at least 500 m²/g and more preferably at least 600 m²/g, as measured by BET surface area analysis using a Tristar 3000 instrument available from Micromeritics Corporation of Norcoss, Georgia, USA.

The crush strength values as reported herein are measured according to the Mobil Test using an anvil/strike plate instrument by determining the resistance of formed molecular sieve extrudate to compressive force. The measurement is performed on cylindrical extrudate having a length to diameter ratio of at least 1:1 and a length greater than 0.32 cm. The determination is performed by placing the extrudate sample between the driven anvil and the fixed strike plate of an instrument comprising a Willrich Test Stand in combination with an Ametek Electronic Force Gauge. The Test Stand comprises a movement that holds the Force Gauge, and a strike plate. The strike plate is considerably larger than the anvil, and during testing carries the extrudate pellet under test. The anvil portion of the instrument comprises a rectangular 0.32 cm×1.27 cm anvil surface arranged to apply compressive force to the pellet carried on the strike plate during the testing procedure. Prior to performing the test the minimum gap between opposed surfaces of the anvil and strike plate is about half the diameter of the cylindrical extrudate pellet.

The sample is prepared by placing the extrudate pellet in a crucible and drying at 121° C. for at least one hour. This step may be eliminated if the sample has been previously dried or calcined. Thereafter, the crucible containing the sample is placed on a crucible tray which is transferred to a muffle furnace at 538° C. for one hour. Drying temperature/time may be altered as appropriate for the material under evaluation. However, consistency in treatment and drying between samples is imperative. All samples being compared for a given project or family should be evaluated after pretreatment at the same temperature/time. After such heating the crucible is removed from the furnace and sealed in a desiccator until cool.

For crush strength determination of a particular molecular sieve product, a representative sample of typically 25 cylindrical extrudate pellets is tested. Such pellets, once cooled in the desiccator, are placed in a Buchner funnel under nitrogen flow. For testing a pellet is removed from the funnel using tweezers and placed on the strike plate directly under the raised anvil in a configuration such that the longitudinal axis of the cylindrical pellet is at 90° to the longitudinal axis of the 0.32 cm×1.27 cm anvil shoe; with the pellet extending entirely across the 0.32 cm width of the anvil shoe. In this configuration, when under test, the anvil subjects a 0.32 cm longitudinal portion of the cylinder wall to the applied compression force. Once the pellet is in the required configuration, the instrument is activated such that the anvil is lowered in controlled fashion to apply gradually increasing force to a 0.32 cm contact area along the "spine" of the pellet until the pellet is crushed. The force reading displayed on the instrument gauge at the point of collapse of the pellet is recorded. This technique is repeated for the 25 pellets of the sample, and the average measured crush strength value for the molecular sieve over the 25 readings is calculated. This crush strength is reported in normalized fashion as the average applied force per unit length along the spine of the extrudate to which the anvil sole is applied. Since the anvil dimension is 0.32 cm the crush strength is reported as force unit (kg) per length unit (cm). Thus, if the measured force is, say, 0.91 kg over the 0.32 cm width of the anvil, the crush strength would be reported as 2.84 kg/cm. As mentioned, the important feature of this test method is the comparative crush strength values obtained for different molecular sieves.

Preferably the molecular sieve compositions and crystallized extrudates have crush strength measured by the above-described Mobil Test of less than 9.8 kg/cm, more preferably less than 7.2 kg/cm and most preferably less than 5.4 kg/cm.

The alpha value test is a measure of the cracking activity of a catalyst and is described in U.S. Pat. No. 3,354,078 and in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

According to other embodiments of this disclosure, there is provided an organic compound e.g., (hydrocarbon) conversion process comprising contacting an organic e.g., hydrocarbon feedstock with a catalyst which comprises the molecular sieve compositions described herein under conversion conditions to convert at least a portion of the feedstock to a converted product.

The molecular sieve compositions having at least one crystalline molecular sieve of this disclosure are useful as catalyst in a wide range of processes, including separation processes and hydrocarbon conversion processes. Specific examples of hydrocarbon conversion processes which are effectively catalyzed by these molecular sieve compositions by itself, or in combination with one or more other catalytically active substances, including for example, other crystalline molecular sieves, comprise the following:

(i) alkylation of aromatic hydrocarbons, e.g., benzene, with long chain olefins, e.g., $C_{14}$ olefin, with reaction conditions including, individually or in any combination, a temperature of from about 340° C. to about 500° C., a pressure of from about 101 to about 20200 kPa-a (absolute), a weight hourly space velocity of from about 2 $hr^{-1}$ to about 2000 $hr^{-1}$ and an aromatic hydrocarbon/olefin mole ratio of from about 1/1 to about 20/1, to provide long chain alkyl aromatics which can be subsequently sulfonated to provide synthetic detergents;

(ii) alkylation of aromatic hydrocarbons with gaseous olefins to provide short chain alkyl aromatic compounds, e.g., the alkylation of benzene with propylene to provide cumene, with reaction conditions including, individually or in any combination, a temperature of from about 10° C. to about 125° C., a pressure of from about 101 to about 3030 kPa-a, and an aromatic hydrocarbon weight hourly space velocity (WHSV) of from 5 $hr^{-1}$ to about 50 $hr^{-1}$;

(iii) alkylation of reformate containing substantial quantities of benzene and toluene with fuel gas containing $C_5$ olefins to provide, inter alia, mono- and di-alkylates with reaction conditions including, individually or in any combination, a temperature of from about 315° C. to about 455° C., a pressure of from about 3000 to about 6000 kPa-a, a WHSV-olefin of from about 0.4 $hr^{-1}$ to about 0.8 $hr^{-1}$, a WHSV-reformate of from about 1 $hr^{-1}$ to about 2 $hr^{-1}$ and a gas recycle of from about 1.5 to 2.5 vol/vol fuel gas feed;

(iv) alkylation of aromatic hydrocarbons, e.g., benzene, toluene, xylene and naphthalene, with long chain olefins, e.g., $C_{14}$ olefin, to provide alkylated aromatic lube base stocks with reaction conditions including, individually or in any combination, a temperature of from about 160° C. to about 260° C. and a pressure of from about 2600 to 3500 kPa-a;

(v) alkylation of phenols with olefins or equivalent alcohols to provide long chain alkyl phenols with reaction conditions including, individually or in any combination, a temperature of from about 200° C. to about 250° C., a pressure of from about 1500 to 2300 kPa-a and a total WHSV of from about 2 $hr^{-1}$ to about 10 $hr^{-1}$;

(vi) conversion of light paraffins to olefins and aromatics with reaction conditions including, individually or in any combination, a temperature of from about 425° C. to about 760° C. and a pressure of from about 170 to about 15000 kPa-a;

(vii) conversion of light olefins to gasoline, distillate and lube range hydrocarbons with reaction conditions including, individually or in any combination, a temperature of from about 175° C. to about 375° C. and a pressure of from about 800 to about 15000 kPa-a;

(viii) two-stage hydrocracking for upgrading hydrocarbon streams having initial boiling points above about 260° C. to premium distillate and gasoline boiling range products in a first stage using the MCM-22 family molecular sieve of this disclosure in combination with a Groups 8-10 metal as catalyst with effluent therefrom being reaction in a second stage using zeolite beta, also in combination with a Groups 8-10 metal, as catalyst, the reaction conditions including, individually or in any combination, a temperature of from about 340° C. to about 455° C., a pressure of from about 3000 to about 18000 kPa-a, a hydrogen circulation of from about 176 to about 1760 liter/liter and a liquid hourly space velocity (LHSV) of from about 0.1 to 10 $h^{-1}$;

(ix) a combination hydrocracking/dewaxing process in the presence of the MCM-22 family molecular sieve of this disclosure and a hydrogenation component as catalyst, or a mixture of such catalyst and zeolite beta, with reaction conditions including, individually or in any combination, a temperature of from about 350° C. to about 400° C., a pressure of from about 10000 to about 11000 kPa-a, an LHSV of from about 0.4 to about 0.6 and a hydrogen circulation of from about 528 to about 880 liter/liter;

(x) reaction of alcohols with olefins to provide mixed ethers, e.g., the reaction of methanol with isobutene and/or isopentene to provide methyl-t-butyl ether (MTBE) and/or t-amyl methyl ether (TAM) with conversion conditions including, individually or in any combination, a temperature of from about 20° C. to about 200° C., a pressure of from 200 to about 20000 kPa-a, a WHSV (gram-olefin per hour gram-zeolite) of from about 0.1 $hr^{-1}$ to about 200 $hr^{-1}$ and an alcohol to olefin molar feed ratio of from about 0.1/1 to about 5/1;

(xi) toluene disproportionation with $C_9+$ aromatics as co-feed with reaction conditions including, individually or in any combination, a temperature of from about 315° C. to about 595° C., a pressure of from about 101 to about 7200 kPa-a, a hydrogen/hydrocarbon mole ratio of from about 0 (no added hydrogen) to about 10 and a WHSV of from about 0.1 $hr^{-1}$ to about 30 $hr^{-1}$;

(xii) preparation of the pharmaceutically-active compound 2-(4-isobutylphenyl) propionic acid, i.e. ibuprofen, by reacting isobutyl benzene with propylene oxide to provide the intermediate 2-(4-isobutylphenyl) propanol followed by oxidation of the alcohol to the corresponding carboxylic acid;

(xiii) use as an acid-binding agent in the reaction of amines with heterocyclic fiber-reactive components in preparation of dyes to prepare practically salt-free reactive dye-containing solution, as in German Patent No. DE 3,625,693, incorporated entirely herein by reference;

(xiv) as the absorbent for separating 2,6-toluene diisocyanate (2,6-TDI) from isomers if TDI as in U.S. Pat. No. 4,721,807, incorporated entirely herein by reference, whereby a feed mixture comprising 2,6-TDI and 2,4-TDI is contacted with the present MCM-22 family molecular sieve which has been cation-exchanged with K ions to absorb the 2,6-TDI, followed by recovering the 2,6-TDI by desorption with desorbent material comprising toluene;

(xv) as the absorbent for separating 2,4-TDI from its isomers as in U.S. Pat. No. 4,721,806, incorporated entirely herein by reference, whereby a feed mixture comprising 2,4-TDI and 2,6-TDI is contact with the present MCM-22 family molecular sieve which has been cation-exchanged with Na, Ca Li and/or Mg ions to absorb the 2,4-TDI, followed by recovering the 2,4-TDI by desorption with desorbent material comprising toluene;

(xvi) in a process for decreasing the durene content of a 90-200° C.+ bottoms fraction obtained from the catalytic conversion of methanol to gasoline which comprises contacting the durene-containing bottoms fraction with hydrogen over a catalyst of the present MCM-22 family molecular sieve with a hydrogenation metal, at conditions including, individually or in any combination, a temperature of from about 230° C. to about 425° C. and a pressure of from about 457 to about 22000 kPa-a;

(xvii) in a processes for co-producing phenol and ketones that proceed through benzene alkylation, followed by formation of the alkylbenzene hydroperoxide and cleavage of the alkylbenzene hydroperoxide into phenol and ketone, e.g., benzene and propylene to phenol and acetone, benzene and $C_4$ olefins to phenol and methyl ethyl ketone, such as those described for example in international application PCT/EP2005/008557, which can be followed by conversion of phenol and acetone to bis-phenol-A as described in international application PCT/EP2005/008554, benzene to phenol and cyclohexanone, or benzene and ethylene to phenol and methyl ethyl ketone, as described for example in PCT/EP2005/008551;

(xviii) in a process of benzene alkylation reactions where selectivity to the monoalkylbenzene is required, e.g., selectively sec-butylbenzene from benzene and $C_4$ olefin feeds that are rich in linear butenes, as described in international application PCT/EP2005/008557, preferably, this conversion is carried out by co-feeding benzene and the $C_4$ olefin feed with the catalyst of the present invention, at a temperature of about 60° C. to about 260° C., for example of about 100° C. to 200° C., a pressure of 7000 kPa-a or less, and a feed weight hourly space velocity (WHSV) based on $C_4$ alkylating agent of from about 0.1 to 50 $h^{-1}$ and a molar ratio of benzene to $C_4$ alkylating agent from about 1 to about 50; and (xix) in a process for transalkylations, such as, for example, polyalkylbenzene transalkylations.

In the case of many catalysts, it is desirable to incorporate the molecular sieve compositions having at least one crystalline molecular sieve with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the molecular sieve compositions of this disclosure, i.e. combined therewith or present during synthesis of the molecular sieve compositions, which are active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. The materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the molecular sieve compositions include the montmorillonite and kaolin family, which families include the subbentonites, and the kaolins commonly known as Dixie, McNamee, Georgia and Florida clays or others in which the main mineral constituent is halloysite, kaolinite, dictite, narcite, or anauxite. Such clays can be used in the raw state as originally mined or initially subjected to calcination, acid treatment or chemical modification. Binders useful for compositing with the present dual molecular sieve composition also include inorganic oxides, notably alumina.

In addition to the foregoing materials, the molecular sieve composition can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of molecular sieve compositions and inorganic oxide matrix vary widely, with the content of the molecular sieve compositions ranging from about 1 to about 99 percent by weight and more usually, particularly when the composite is prepared in the form of beads, in the range of about 20 to about 80 wt. % of the composite.

In one or more numbered embodiments, this disclosure relates to:

1. A method of preparing a molecular sieve composition having at least one crystalline molecular sieve comprising the steps of:
   a. providing a reaction mixture comprising at least one source of ions of tetravalent element Y, at least one source of alkali metal hydroxide, water, optionally at least one seed crystal, and optionally at least one source of ions of trivalent element X, said reaction mixture having the following molar composition:
      $Y:X_2$=2 to infinity
      $OH^-:Y$=0.001 to 2
      $M^+:Y$=0.001 to 2
   wherein M is an alkali metal and the amount of water is at least sufficient to permit extrusion of said reaction mixture, wherein in one or more embodiments said reaction mixture is substantially free of crystalline molecular sieve (not including the optional seed crystals);
   b. extruding said reaction mixture to form a pre-formed extrudate; and
   c. crystallizing said pre-formed extrudate in a liquid medium comprising water under liquid phase crystallization conditions to form said molecular sieve composition having said crystalline molecular sieve.

2. The method according to embodiment 1, characterized by said pre-formed extrudate comprising a structure directing agent R.

3. The method according to any preceding embodiment, characterized by said liquid medium comprising structure directing agent R.

4. The method according to any preceding embodiment, characterized by said pre-formed extrudate being submerged in said liquid medium.

5. The method according to any preceding embodiment, characterized by said liquid medium being agitated.

6. The method according to any preceding embodiment, characterized by said crystallized extrudate comprises less than 20 wt. % of non-crystalline materials.

7. The method according to any preceding embodiment, characterized by said crystallized extrudates having a crush strength less than 9.8 kg/cm.

8. The method according to any preceding embodiment, characterized by the method comprising the additional steps of washing and drying the crystalline molecular sieve product.

9. The method according to any preceding embodiment, characterized by the mixture being dried prior to performing step (c).

10. The method according to any preceding embodiment, characterized by the mixture being exposed to an autogenous pressure in the range of 345 kPa-a to 3450 kPa-a and a temperature of 50° C. to 250° C. during crystallizing step.
11. The method according to any preceding embodiment, characterized by the Y:X$_2$ ratio being from 2 to 1000.
12. The method according to any preceding embodiment, characterized by the H$_2$O:Y ratio being from 0.1 to 300.
13. The method according to any preceding embodiment, the OH$^-$:Y ratio being from 0.1 to 1.
14. The method according to any preceding embodiment, characterized by the M$^+$:Y ratio being from 0.01 to 2.
15. The method according to any preceding embodiment, characterized by the mixture being suited to form crystals of molecular sieves of the MCM-22 family under said liquid phase crystallization conditions.
16. The method according to embodiment 15, characterized by the MCM-22 family molecular sieves comprising at least one of MCM-22, MCM-49, and MCM-56.
17. The method according to any preceding embodiment, characterized by the tetravalent element comprising silicon.
18. The method according to any preceding embodiment, characterized by the trivalent element comprising aluminum.
19. The method of any preceding embodiment, wherein said reaction mixture of extruding step (b) further comprises a first crystalline molecular sieve, said molecular sieve composition of crystallizing step (c) further comprises a second crystalline molecular sieve, and said second crystalline molecular sieve is different from said first crystalline molecular sieve.
20. The method of any preceding embodiment, characterized by the first crystalline molecular sieve comprising at least one of zeolite beta, zeolite Y, mordenite, ZSM-5, ZSM-23, ZSM-11, ZSM-22, ZSM-35 and ZSM-12.
21. A crystalline molecular sieve prepared by any preceding embodiment.
22. A process for converting hydrocarbons comprising the step of contacting a hydrocarbon feedstock under conversion conditions with a crystalline molecular sieve of embodiment 21.

Embodiments of this disclosure will now be described in the following Examples to further illustrate this disclosure.

EXPERIMENTAL

Preparation of HMI-Free Aluminosilicate Pre-Formed Extrudate

Aluminosilicate pre-formed extrudates were prepared from a mixture of 908 grams of Ultrasil silica, 180 grams of sodium aluminate solution (45 wt. %), and 104 grams of 50 wt. % sodium hydroxide solution, 1080 grams of DI water, and 40 grams of MCM-22 seed crystals. The mixture had the following molar composition:
SiO$_2$/Al$_2$O$_3$=29.4
H$_2$O/SiO$_2$=4.54
OH$^-$/SiO$_2$=0.17
Na$^+$/SiO$_2$=0.17
The mixture was mulled and formed into 1.59 mm cylinder extrudates. The wet extrudates were then stored in a sealed container before use. Dried extrudates were prepared separately by drying the wet extrudates in an oven at 120° C. for 2 hrs.

Example 1

Five hundred grams of dried extrudates were placed in an autoclave with wire mesh support. A mixture of 300 grams of DI water and 1235 grams of HMI was added to cover the extrudates.

The extrudates were crystallized at 171° C. for 24 hrs. After the reaction, the product was discharged, washed with water, and dried at 121° C. XRD patterns of the top and bottom samples collected from the extrudate bed showed the typical pure phase of MCM-22 topology at top and low crystallinity with trace of impurities at bottom, see FIGS. 1A & B. The uneven distribution of HMI was believed to be the reason for this result. The resulting extrudates showed a relatively low crush strength.

Example 2

One thousand and sixty grams of wet extrudates were placed in an autoclave with wire mesh support. A mixture of 657 grams of DI water and 200 grams of HMI was added to cover the extrudates.

The extrudates were crystallized at 171° C. for 24 hrs. After the reaction, the product was discharged, washed with water, and dried at 121° C. XRD patterns of the top and bottom samples, collected from the charged extrudate bed, showed the typical pure phase of MCM-22 topology at top and low crystallinity with trace of impurities at bottom, see FIGS. 1C & D. The uneven distribution of HMI was believed to be the reason for this result. The resulting extrudates showed a relatively low crush strength.

Example 3

One hundred fifteen grams of pre-formed dried extrudates were placed in a 600 ml autoclave with wire mesh support. The distance between the bottom of the autoclave and wire mesh support is greater than 12.7 mm. A mechanical stir was installed to stir the liquid medium. A mixture of 330 grams of DI water and 50 grams of HMI was added to cover the charged extrudates.

Figures 2A, 2B, 2C, 2D:
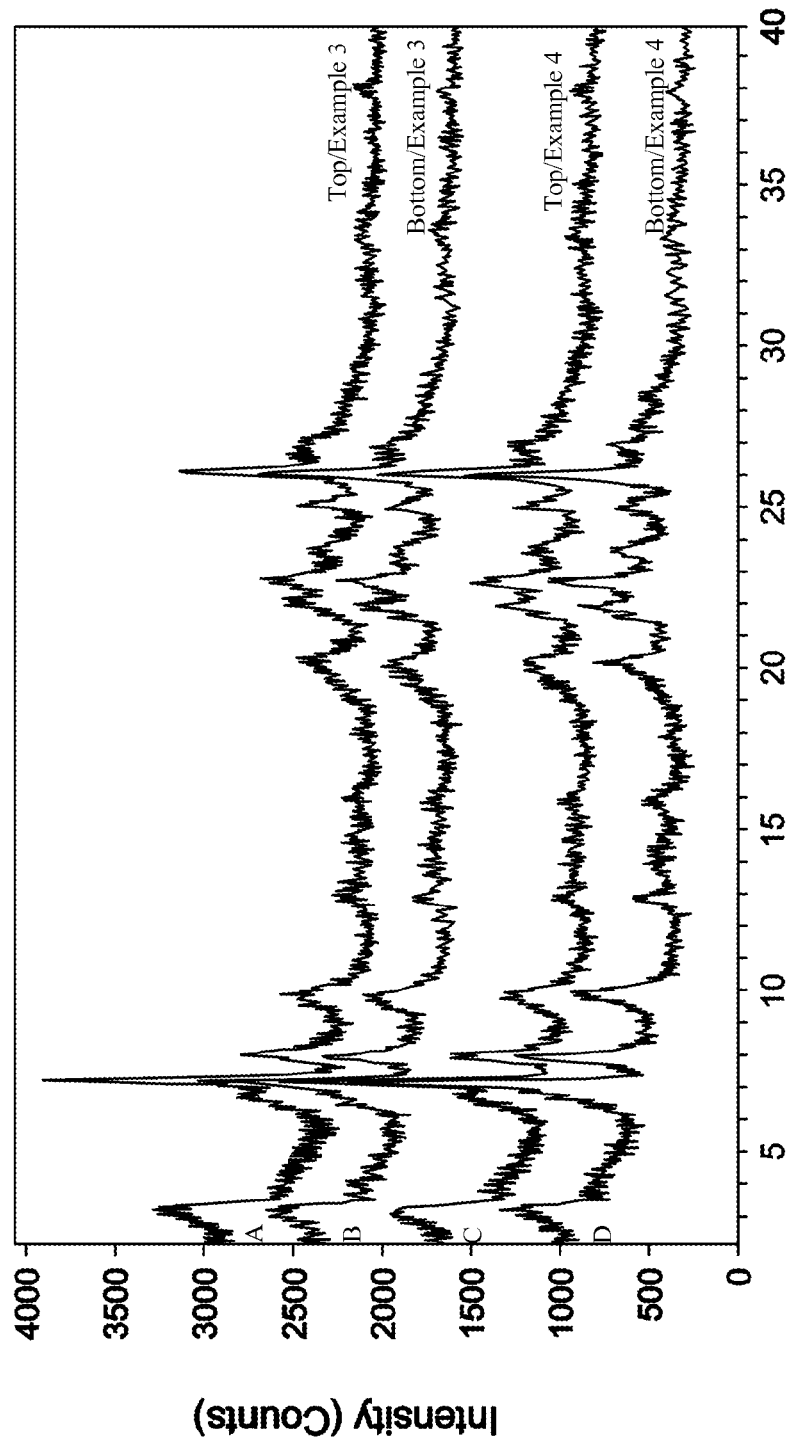
FIGS. 2A, 2B, 2C, and 2D show XRD patterns of samples made in Examples 3 and 4.

The extrudates were crystallized at 171° C. for 24 hrs at 150 rpm. After the reaction, the product was discharged, washed with water, and dried at 121° C. The XRD pattern of the as-synthesized materials from top and bottom showed the typical pure phase of MCM-22, see FIGS. 2 A & B. The SEM of the as-synthesized material showed that the material was composed of agglomerates of MCM-22 platelet crystals. The addition of stirring showed a significant improvement in product quality due to the better circulation of the HMI/water mixture inside the autoclave. Calcined extrudate had a surface area of 610 m$^2$/g and Si/Al$_2$ ratio of 24.3. The resulting extrudates showed a relatively low crush strength.

Example 4

Two hundred grams of pre-formed wet extrudates were placed in a 600 ml autoclave with wire mesh support. The distance between the bottom of the autoclave and wire mesh support is greater than 12.7 mm. A mechanical stir was installed to stir the liquid medium. A mixture of 265 grams of DI water and 50 grams of HMI was added to cover the charged extrudates.

The extrudates were crystallized at 171° C. for 24 hrs at 150 rpm. After the reaction, the product was discharged, washed with water, and dried at 121° C. The XRD pattern of the as-synthesized materials from top and bottom showed the typical phase of MCM-22, see FIGS. 2 C & D. The SEM of the as-synthesized material showed that the material was composed of agglomerates of MCM-22 platelet crystals. The addition of stirring showed a significant improvement in product quality due to the better circulation of the HMI/water mixture inside the autoclave. Calcined extrudate had a surface area of 578 m$^2$/g and Si/Al$_2$ ratio of 24.5. The resulting extrudates showed a relatively low crush strength.

Example 5

Six hundred thirty-five (635) grams of wet pre-formed wet extrudates were placed in an autoclave with wire mesh support. The distance between bottom of autoclave and wire mesh support is greater than 12.7 mm. A mixture of 200 grams HMI and 981 grams DI water was added into the autoclave to cover the charged extrudates.

Figure 3B:
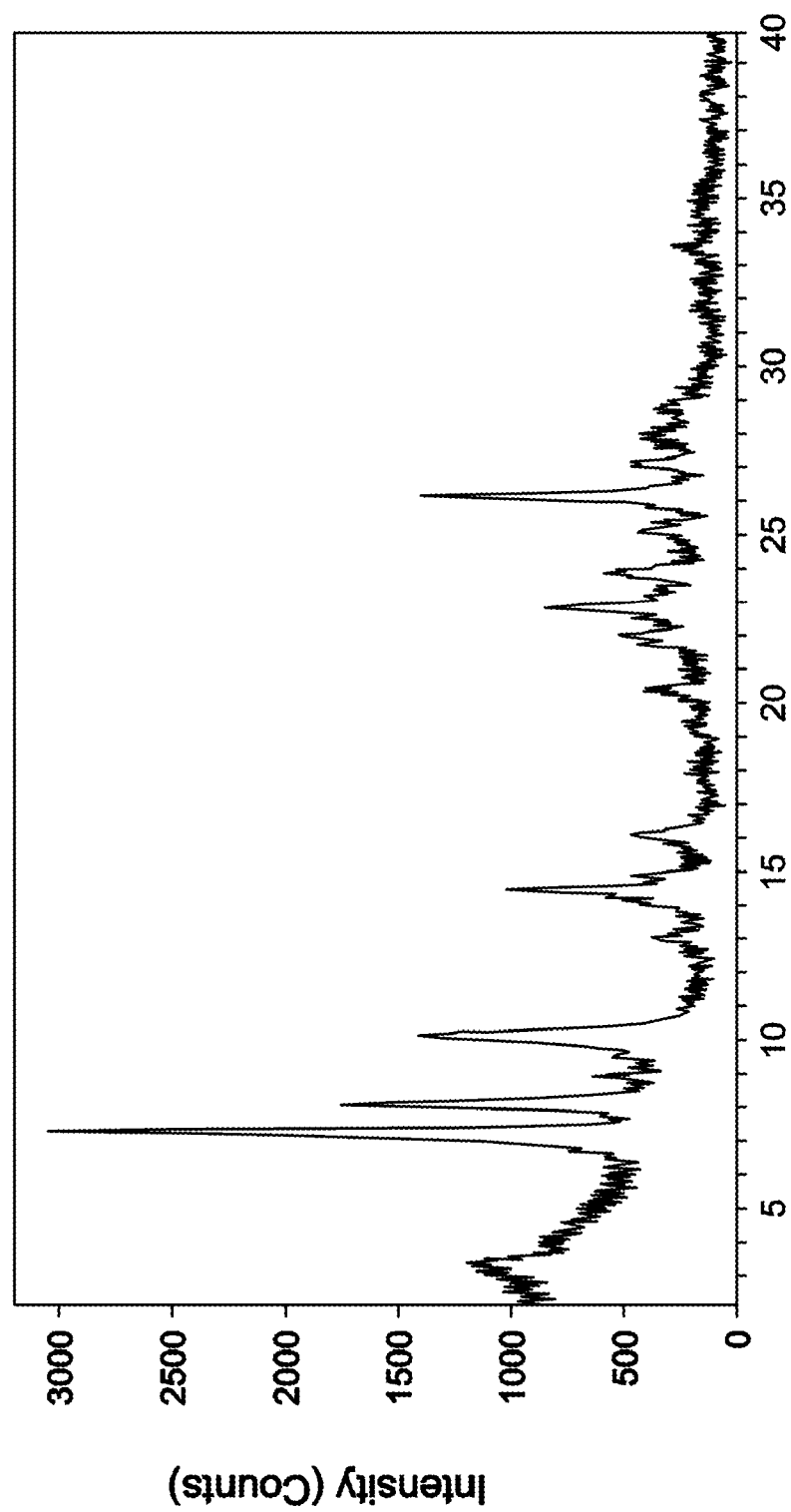

The extrudates were crystallized at 171° C. for 24 hrs at 150 rpm. After the reaction, the product was discharged, washed with water, and dried at 121° C. The XRD pattern of the calcined products, extrudate and powder, showed the typical phase of MCM-22, see FIGS. 3 A & B, and the resulting powders did show a small trace of impurities. The SEM of the as-synthesized material showed that the material was composed of agglomerates of MCM-22 platelet crystals. The addition of stirring showed a significant improvement in product quality due to the better circulation of the HMI/water mixture inside the autoclave. Calcined extrudate had a surface area of 608 m$^2$/g and Si/Al$_2$ ratio of ~24.5. The as-synthesized extrudates were pre-calcined in nitrogen at 482° C. for 3 hrs and then were converted into the hydrogen form by three ion-exchanges with ammonium nitrate solution at room temperature, followed by drying at 120° C., and calcination at 540° C. for 6 hours. The resulting exchanged extrudate shows an Alpha value of 800. The resulting extrudates showed a relatively low crush strength.

Preparation of Beta/MCM-22 Pre-Formed Extrudates

Example 6

Pre-formed extrudates containing zeolite beta and MCM-22 were prepared from a mixture of 454 grams of Ultrasil silica, 250 grams of zeolite beta crystal, 165 grams of HMI, 90 grams of sodium aluminate solution (45%), and 52 grams of 50% sodium hydroxide solution, 500 grams of DI water, and 20 grams of MCM-22 seed crystals. The mixture had the following molar composition:

SiO$_2$/Al$_2$O$_3$=30.1
H$_2$O/SiO$_2$=5.7
OH$^-$/SiO$_2$=0.17
Na$^+$/SiO$_2$=0.17
HMI/SiO$_2$=0.24

The ratio of zeolite beta crystal/Ultrasil silica was approximately 35/65 on a weight basis. The mixture was then mulled and formed into 1.59 mm cylindrical extrudates using a mini-extruder. The extrudates were then stored in a sealed container before use.

The pre-formed wet extrudates were placed in a 2-liter autoclave with wire mesh support. Additional HMI and DI water were added into the autoclave to cover the charged extrudates. The distance between bottom of autoclave and wire mesh support is greater than 12.7 mm.

The extrudates were crystallized at 171° C. for 36 hrs at 150 ppm. After the reaction, the product was discharged, washed with water, and dried at 121° C. The XRD pattern of the as-synthesized material showed the typical mixed phases of MCM-22 and zeolite beta with Ferrierite impurity. The SEM of the as-synthesized material showed that the material was composed of layers morphology of MCM-22 platelet crystals, sphere-like beta crystals, and rod-like Ferrierite crystals. Surface area of calcined product was 502 m$^2$/g.

When numerical lower limits and numerical upper limits are listed herein, ranges from any lower limit to any upper limit are contemplated.

The meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all patents and patent applications, test procedures (such as ASTM methods), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated. Note further that Trade Names used herein are indicated by a ™ symbol or ® symbol, indicating that the names may be protected by certain trademark rights, e.g., they may be registered trademarks in various jurisdictions.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A method of preparing a molecular sieve composition having at least one crystalline molecular sieve comprising the steps of:
   a. providing a reaction mixture comprising at least one source of ions of tetravalent element Y, at least one source of alkali metal hydroxide, water, optionally at least one seed crystal, and optionally at least one source of ions of trivalent element X, said reaction mixture having the following molar composition:
      Y:X$_2$=2 to infinity
      OH$^-$:Y=0.001 to 2
      M$^+$:Y=0.001 to 2
      wherein M is an alkali metal and the amount of water is at least sufficient to permit extrusion of said reaction mixture, wherein said reaction mixture is substantially free of a crystalline molecular sieve (not including the optional seed crystals);
   b. extruding said reaction mixture to form a pre-formed extrudate; and
   c. crystallizing said pre-formed extrudate in a liquid medium comprising water under liquid phase conditions to form said molecular sieve composition having said crystalline molecular sieve.

2. The method according to claim 1, characterized by said pre-formed extrudate comprising a structure directing agent R.

3. The method according to claim 1, characterized by said liquid medium comprising structure directing agent R.

4. The method according to claim 1, characterized by said pre-formed extrudate being submerged in said liquid medium.

5. The method according to claim 1, characterized by said liquid medium being agitated.

6. The method according to claim 1, characterized by said crystallized extrudate comprises less than 20 wt. % of non-crystalline materials.

7. The method according to claim 1, characterized by said crystallized extrudates having a crush strength less than 9.8 kg/cm.

8. The method according to claim 1, characterized by the method comprising the additional steps of washing and drying the crystalline molecular sieve product.

9. The method according to claim 1, characterized by the mixture being dried prior to performing step (c).

10. The method according to claim 1, characterized by the mixture being exposed to an autogenous pressure in the range of 345 kPa-a to 3450 kPa-a and a temperature of 50° C. to 250° C. during crystallizing step.

11. The method according to claim 1, characterized by the $Y:X_2$ ratio being about 2 to about 1000.

12. The method according to claim 1, characterized by the $H_2O:Y$ ratio being 0.1 to 30.

13. The method according to claim 1, the $OH^-:Y$ ratio being 0.1 to 1.

14. The method according to claim 1, characterized by the mixture being suited to form crystals of molecular sieves of the MCM-22 family under said liquid phase crystallization conditions.

15. The method according to claim 14, characterized by the MCM-22family molecular sieves comprising at least one of MCM-22, MCM-49, and MCM-56.

16. The method according to claim 1, characterized by the tetravalent element comprising silicon.

17. The method according to claim 1, characterized by the trivalent element comprising aluminum.

18. The method according to claim 1, wherein said reaction mixture of said extruding step (b) further comprises a first crystalline molecular sieve, said molecular sieve composition of crystallizing step (c) further comprises a second crystalline molecular sieve, and said second crystalline molecular sieve is different from said first crystalline molecular sieve.

19. The method of claim 18, characterized by the first crystalline molecular sieve comprising at least one of zeolite beta, zeolite Y, mordenite, ZSM-5, ZSM-23, ZSM-11, ZSM-22, ZSM-35 and ZSM-12.

* * * * *

UNITED STATES PATENT AND TRADEMARK OFFICE
CERTIFICATE OF CORRECTION

PATENT NO.        : 8,398,955 B2                                   Page 1 of 1
APPLICATION NO.   : 12/738055
DATED             : March 19, 2013
INVENTOR(S)       : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 429 days.

Signed and Sealed this

First Day of September, 2015

Michelle K. Lee
*Director of the United States Patent and Trademark Office*